(12) United States Patent
Itozawa et al.

(10) Patent No.: US 12,353,218 B2
(45) Date of Patent: Jul. 8, 2025

(54) AREA RECOGNITION SYSTEM, AREA RECOGNITION METHOD, AND PROGRAM INCLUDING MAGNETIC MEMBERS FOR RECOGNIZING A TRAVEL AREA OF A ROBOT

(71) Applicant: TOYOTA JIDOSHA KABUSHIKI KAISHA, Toyota (JP)

(72) Inventors: Yuta Itozawa, Nagoya (JP); Kunihiro Iwamoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 18/302,353

(22) Filed: Apr. 18, 2023

(65) Prior Publication Data
US 2023/0367328 A1    Nov. 16, 2023

(30) Foreign Application Priority Data

May 16, 2022    (JP) .................................. 2022-080177

(51) Int. Cl.
*G05D 1/02*    (2020.01)
*G05D 1/00*    (2006.01)

(52) U.S. Cl.
CPC ......... *G05D 1/0259* (2013.01); *G05D 1/0214* (2013.01); *G05D 1/0223* (2013.01)

(58) Field of Classification Search
CPC ... G05D 1/0259; G05D 1/0214; G05D 1/0223
See application file for complete search history.

(56) References Cited

U.S. PATENT DOCUMENTS

2011/0160949 A1*   6/2011   Kondo ................. G05D 1/0265
                                                               701/23

FOREIGN PATENT DOCUMENTS

| CN | 111966104 | A | * | 11/2020 |
| JP | 5-189028 | A | | 7/1993 |
| JP | H05189028 | A | * | 7/1993 |
| JP | 2000099146 | A | * | 4/2000 |

(Continued)

OTHER PUBLICATIONS

English translation of JP-2000099146-A (Year: 2000).*
(Continued)

*Primary Examiner* — Navid Z. Mehdizadeh
*Assistant Examiner* — Matthew Ho
(74) *Attorney, Agent, or Firm* — Sughrue Mion, PLLC

(57) ABSTRACT

One or more magnetic members including a magnetic member, and two magnetic members are disposed between the different travel areas. A polarity of the magnetic member on an upper surface side is a first magnetic pole. A polarity of each of the two magnetic members on the upper surface side is a second magnetic pole. The robot includes a magnetic sensor configured to detect the first magnetic pole, a safety apparatus configured to suppress an operation of the robot in response to the detection of the first magnetic pole, a magnetic sensor, a switching unit configured to switch between a stopped state and an operable state of the safety apparatus in response to the detection of the second magnetic pole, and a recognition unit configured to recognize a movement of the robot between the different travel areas by detecting each of the one or more magnetic members.

6 Claims, 4 Drawing Sheets

(56) References Cited

FOREIGN PATENT DOCUMENTS

JP          2010066074 A  *  3/2010
WO    WO-2017016453 A1  *  2/2017  ............. B61B 13/08

OTHER PUBLICATIONS

English translation of CN-111966104-A (Year: 2020).*
English translation of WO-2017016453-A1 (Year: 2017).*
English translation of JP H05189028 A (Year: 1993).*
English translation of JP-2010066074-A (Year: 2010).*

* cited by examiner

AREA RECOGNITION SYSTEM, AREA RECOGNITION METHOD, AND PROGRAM INCLUDING MAGNETIC MEMBERS FOR RECOGNIZING A TRAVEL AREA OF A ROBOT

CROSS REFERENCE TO RELATED APPLICATIONS

This application is based upon and claims the benefit of priority from Japanese patent application No. 2022-080177, filed on May 16, 2022, the disclosure of which is incorporated herein in its entirety by reference.

BACKGROUND

The present disclosure relates to an area recognition system, an area recognition method, and a program.

In some cases, a track for driverless vehicles may be divided into high-speed sections and low-speed sections. Japanese Unexamined Patent Application Publication No. H05-189028 discloses a technique for providing N-pole magnets and S-pole magnets between low-speed sections and high-speed sections to recognize areas.

SUMMARY

A robot may include a safety apparatus that operates in response to a detection of magnetism. In such cases, a magnetic member installed to recognize an area could cause the robot's safety apparatus to malfunction.

The present disclosure has been made to solve such a problem, and an object thereof is to provide an area recognition system, an area recognition method, and a program that can recognize a travel area while preventing a safety apparatus from malfunctioning.

In an aspect, an area recognition system for recognizing a travel area of a robot includes:
  one or more magnetic members including a first magnetic member, and two magnetic members disposed between different travel areas.
  A polarity of the first magnetic member on an upper surface side thereof is a first magnetic pole, the first magnetic pole being one of an N-pole and an S-pole,
    a polarity of each of the two magnetic members on an upper surface side is a second magnetic pole, the second magnetic pole being different from the first magnetic pole, and
  the one or more magnetic members are disposed between the two magnetic members.
  The robot includes:
  a first magnetic sensor configured to detect the first magnetic pole;
  a safety apparatus configured to suppress an operation of the robot in response to the detection of the first magnetic pole;
  a second magnetic sensor configured to be capable of detecting both the first and second magnetic poles;
  a switching unit configured to switch between a stopped state and an operable state of the safety apparatus in response to the detection of the second magnetic pole; and
  a recognition unit configured to recognize a movement of the robot between the different travel areas by detecting each of the one or more magnetic members.

In another aspect, an area recognition method for recognizing a travel area of a robot,
  one or more magnetic members including a first magnetic member, and two magnetic members being disposed between the different travel areas,
    a polarity of the first magnetic member on an upper surface side thereof being a first magnetic pole, the first magnetic pole being one of an N-pole and an S-pole,
    a polarity of each of the two magnetic members on an upper surface side being a second magnetic pole, the second magnetic pole being different from the first magnetic pole, and
  the one or more magnetic members being disposed between the two magnetic members, and
  the robot including:
    a first magnetic sensor configured to detect the first magnetic pole;
    a safety apparatus configured to suppress an operation of the robot in response to the detection of the first magnetic pole; and
    a second magnetic sensor configured to be capable of detecting both the first and second magnetic poles,
  the area recognition method including:
    switching, by the robot, between a stopped state and an operable state of the safety apparatus in response to the detection of the second magnetic pole; and
    recognizing, by the robot, a movement between the different travel areas by detecting each of the one or more magnetic members.

In another aspect, a program causes a computer to execute the above area recognition method.

According to the present disclosure, it is possible to provide an area recognition system, an area recognition method, and a program that can recognize a travel area while preventing a safety apparatus from malfunctioning.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Although the present disclosure is described below through the embodiment of the disclosure, the disclosure in the claims is not limited to the following embodiment. Moreover, not all of the configurations described in the embodiment are essential as means to solve the problem.

First Embodiment

Figure 1:
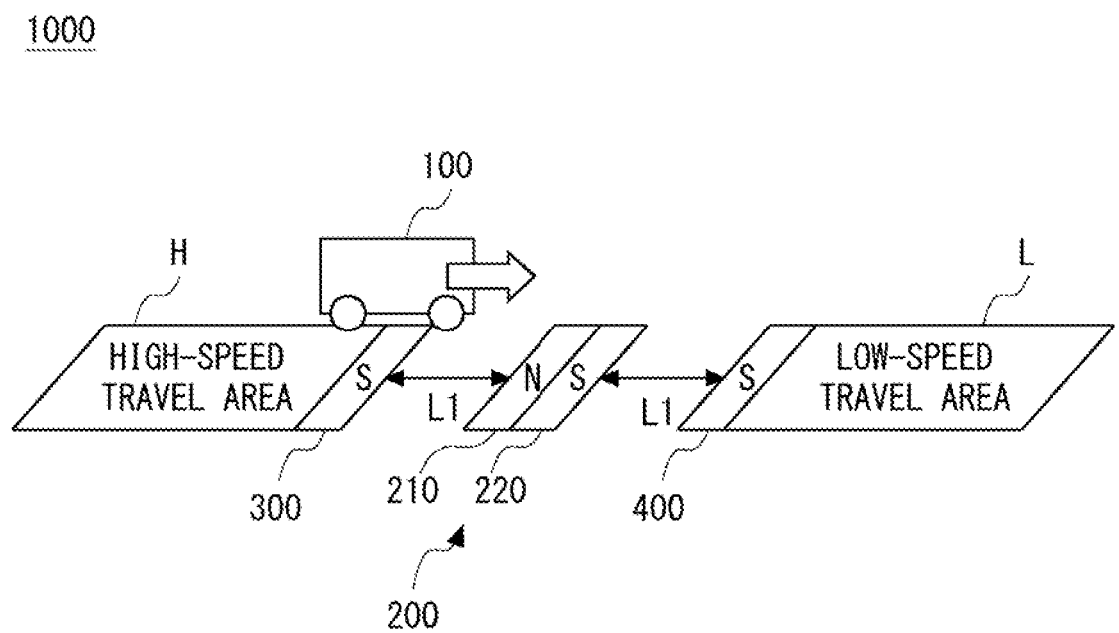
FIG. 1 is an overview diagram showing a configuration of an area recognition system according to a first embodiment.

An area recognition system according to a first embodiment is described below with reference to the drawings. FIG. 1 is an overview diagram showing a configuration of an area recognition system 1000 according to the first embodiment. The area recognition system 1000 is a system for recognizing a travel area of a robot 100.

The area recognition system 1000 includes the robot 100. The travel area of the robot 100 includes a high-speed travel area H and a low-speed travel area L. The robot 100 may be a conveying robot that conveys a load. The area recognition system 1000 may further include a server (not shown) that generates a traveling route for the robot 100. The area recognition system 1000 may also include a system in which processing is completed within the robot 100.

In the high-speed travel area H and the low-speed travel area L, for example, a maximum speed of the robot 100 may be defined. In such a case, the maximum speed in the high-speed travel area H is greater than the maximum speed in the low-speed travel area L.

The area recognition system 1000 includes one or more magnetic members 200, a magnetic member 300, and a magnetic member 400. The one or more magnetic members 200, the magnetic member 300, and the magnetic member 400 are disposed between the high-speed travel area H and the low-speed travel area L. Specifically, the magnetic member 300 is disposed at the end of the high-speed travel area H, the magnetic member 400 is disposed at the end of the low-speed travel area L, and the one or more magnetic members 200 are disposed, for example, in a place halfway between the magnetic member 300 and the magnetic member 400. The one or more magnetic members 200, the magnetic member 300, and the magnetic member 400 may be magnetic tapes or magnets.

Each of the one or more magnetic members 200 is used by the robot 100 to recognize the travel area. Each of one or more magnetic members includes a magnetic member 210. The magnetic member 210 is referred to as a first magnetic member. The polarity of the magnetic member 210 on an upper surface side is a first magnetic pole, which is one of the N- and S-poles. In the following, the first magnetic pole is described mainly as being the N-pole, but the first magnetic pole may be the S-pole. One or more magnetic members 200 are disposed between the magnetic member 300 and the magnetic member 400.

As shown in FIG. 1, each of the one or more magnetic members 200 may further include a magnetic member 220. The magnetic members 210 and 220 are arranged along a direction in which the robot 100 travels (this direction is hereinafter referred to as a traveling direction). Specifically, the polarity of the magnetic member 220 on the upper surface side is a second magnetic pole (e.g., the S-pole), which is different from the first magnetic pole.

Note that the one or more of the magnetic members 200 need not include the magnetic member 220. Also, the magnetic members 210 and 220 may have the same polarity on the upper surface side, and the strength of the magnetic poles of the magnetic members 210 and 220 may be different from each other. Furthermore, the one or more magnetic members 200 may include three or more magnetic members.

Each of distances L1 indicates a distance between each of the one or more magnetic members 200 and the magnetic member 300, and between each of the one or more magnetic members 200 and the magnetic member 400. The length of the distance L1 must satisfy the conditions described later.

The robot 100 may, for example, recognize a movement to the low-speed travel area L if it detects the S-pole after detecting the N-pole, and recognize a movement to the high-speed travel area H if it detects the N-pole after detecting the S-pole. Note that the robot 100 may recognize a movement to a travel area different from the current travel area when it detects the N-pole.

The polarity of the magnetic member 300 and the magnetic member 400 on the upper surface side is the second magnetic pole (e.g., the S-pole). The magnetic member 300 and the magnetic member 400 are used by the robot 100 to switch the state of a safety apparatus 140 described later.

A third magnetic member (not shown) is disposed in each of the low-speed travel area L and the high-speed travel area. The polarity of the third magnetic member on the upper surface side is the first magnetic pole (e.g., the N-pole). The third magnetic member is used to operate the safety apparatus 140 of the robot 100.

Figure 2:
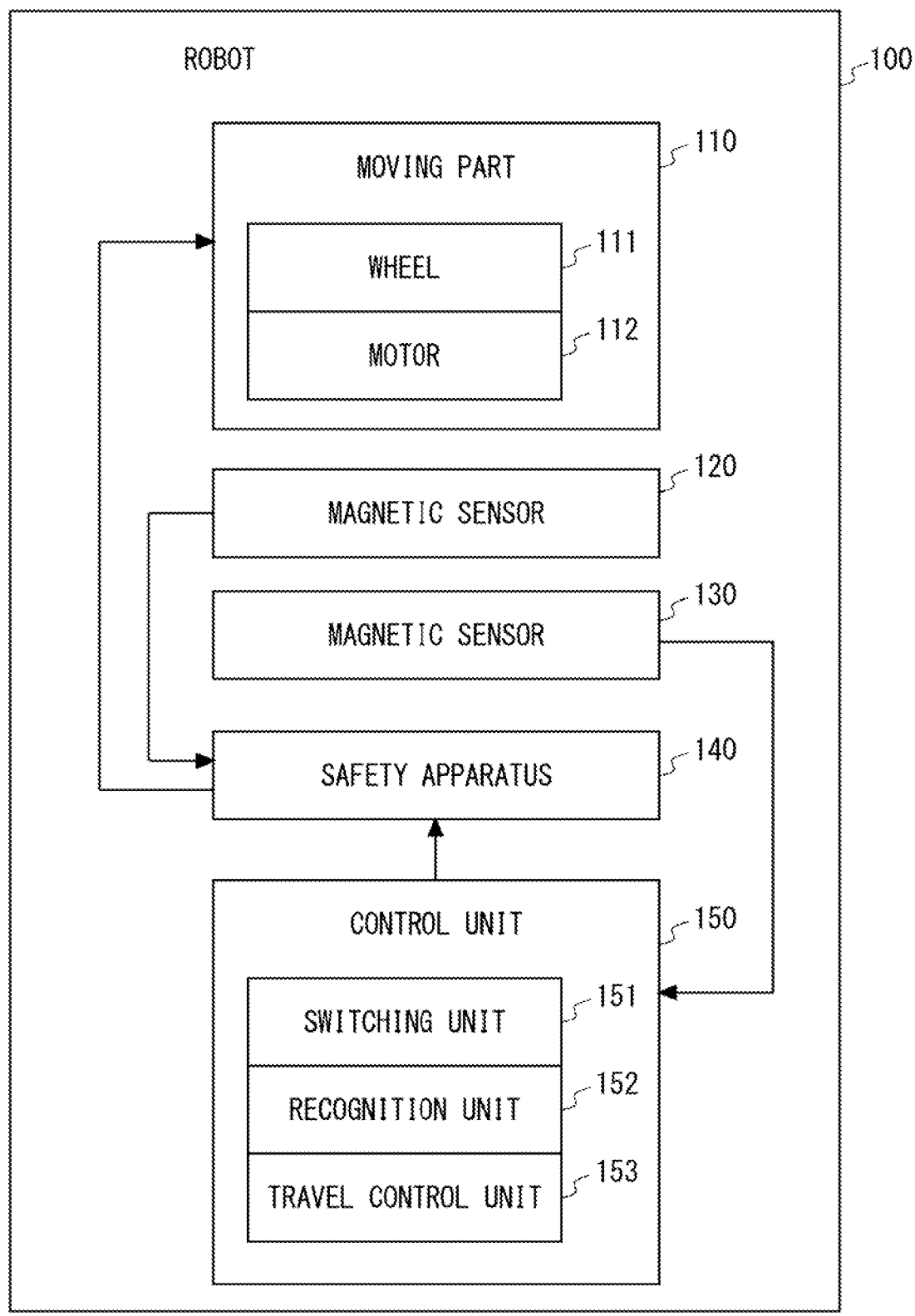
FIG. 2 is a block diagram showing functions of a robot according to the first embodiment.

Next, the functions of the robot 100 are described with reference to FIG. 2. FIG. 2 is a block diagram showing a functional configuration of the robot 100. The robot 100 includes a moving part 110, a magnetic sensor 120, a magnetic sensor 130, the safety apparatus 140, and a control unit 150. The robot 100 may further include a robot arm for moving a load.

The moving part 110 includes a wheel 111 and a motor 112 for rotating the wheel 111. The motor 112 rotates the wheel 111 through a reduction gear or the like. The motor 112 can move the robot 100 to a specified position by rotating the wheel 111 in response to a control signal from the control unit 150. The wheel 111 also stops or decelerates according to an operation of the safety apparatus 140 described later.

The magnetic sensor 120 detects the first magnetic pole (e.g., the N-pole). The magnetic sensor 120 is also referred to as a first magnetic sensor. The number of magnetic sensors 120 may be plural. The detection result of the magnetic sensor 120 is used to operate the safety apparatus 140. The plurality of magnetic sensors 120 may be provided on the outer periphery (e.g., four corners) of the bottom surface of the robot 100. The magnetic sensor 120 outputs the detection result to the safety apparatus 140.

The magnetic sensor 130 detects both the first magnetic pole (e.g., the N-pole) and the second magnetic pole (e.g., the S-pole). The magnetic sensor 130 is also referred to as a second magnetic sensor. The magnetic sensor 130 may be provided, for example, at the center of the bottom surface of the robot 100. The magnetic sensor 130 outputs the detection result to the control unit 150.

Figure 3:
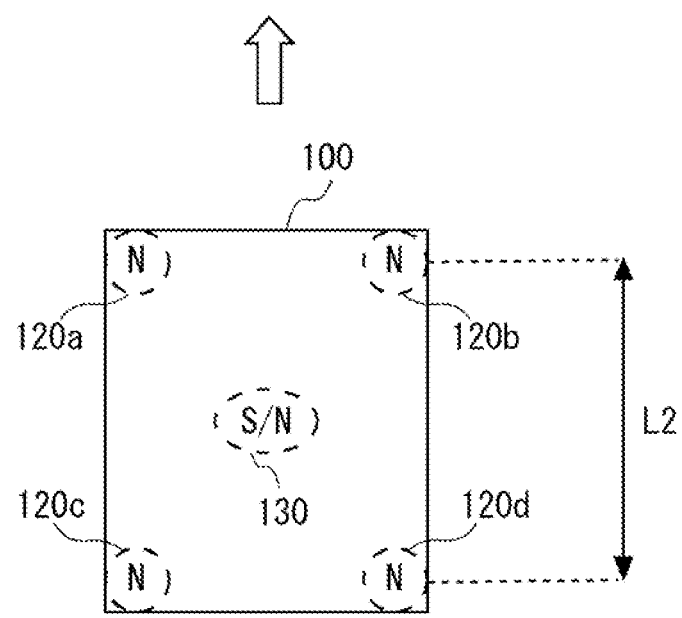
FIG. 3 is a diagram for explaining positions of first and second magnetic sensors.

Next, the positions of the magnetic sensors 120 and the magnetic sensor 130 are described with reference to FIG. 3. The magnetic sensors 120*a*, 120*b*, 120*c*, and 120*d* are specific examples of the magnetic sensor 120 described above. FIG. 3 shows an example in which the robot 100 includes four magnetic sensors 120*a*, 120*b*, 120*c*, and 120*d*, but the number of magnetic sensors 120 is not limited to four.

FIG. 3 is a top view of the robot 100, and the positions of the magnetic sensors 120*a*, 120*b*, 120*c*, 120*d*, and 130 in the horizontal plane are indicated by dotted lines. The magnetic sensors 120*a*, 120*b*, 120*c*, and 120*d* may be provided at four corners of the bottom surface of the robot 100. The magnetic sensors 130 may be provided at the center of the bottom surface of the robot 100.

The first magnetic pole is the N-pole, and the second magnetic pole is the S-pole. In such cases, the magnetic sensors 120*a*, 120*b*, 120*c*, and 120*d* are magnetic sensors that can detect the N-pole, and the magnetic sensor 130 is a magnetic sensor that can detect both the N-pole and the S-pole.

The arrows indicate the traveling direction of the robot 100. The magnetic sensors 120*a* and 120*b* are referred to as front magnetic sensors 120 in the traveling direction of the robot 100. The magnetic sensors 120*c* and 120*d* are referred to as rear magnetic sensors 120 in the traveling direction of the robot 100. The magnetic sensor 130 is disposed in the center between the front magnetic sensors 120 and the rear magnetic sensors 120 in the traveling direction of the robot 100.

A distance L2 indicates a distance between the front magnetic sensors 120 and the rear magnetic sensors 120. The distance L1 shown in FIG. 1 must be at least half of the distance L2. This is to prevent malfunction of the safety apparatus 140.

Returning to FIG. 2, the description is continued. The safety apparatus 140 suppresses the operation of the robot 100 in response to a detection of the first magnetic pole (e.g., the N-pole). The safety apparatus 140 operates according to the detection result of the magnetic sensor 120. For example, the safety apparatus 140 may slow down or stop the rotation of the wheel 111 when the first magnetic pole is detected. The safety apparatus 140 may be implemented as a function of the control unit 150 described later.

A third magnetic member (not shown) is disposed in the low-speed travel area L or the high-speed travel area H to increase the safety of the robot 100 to travel. The polarity of the third magnetic member on the upper surface side is the first magnetic pole. For example, if the third magnetic member is disposed in front of the stairs, the robot 100 can be prevented from falling.

The safety apparatus 140 is configured to be able to switch between a stopped state and an operable state. The safety apparatus 140 may switch states when it receives a predetermined signal from the control unit 150, which will be described later. Therefore, when the state of the safety apparatus 140 is in the operable state, and the magnetic sensor 120 detects the first magnetic pole, the operation of the robot 100 is suppressed. When the safety apparatus 140 is in the stopped state, the operation of the robot 100 is not suppressed even if the magnetic sensor 120 detects the first magnetic pole.

The control unit 150 includes a processor and a memory. The control unit 150 includes a switching unit 151, a recognition unit 152, and a travel control unit 153. Each function of the control unit 150 may be implemented by loading a program (not shown) into the memory and executing the program by the processor.

The switching unit 151 switches between the stopped state and the operable state of the safety apparatus 140 in response to a detection of the second magnetic pole (e.g., the S-pole). That is, the switching unit 151 switches between the stopped state and the operable state of the safety apparatus 140 in response to a detection of the second magnetic pole by the magnetic sensor 130.

The recognition unit 152 recognizes that the robot 100 has moved between different travel areas by detecting each of one or more magnetic members 200. When the second magnetic pole is detected after the first magnetic pole is detected, the recognition unit 152 recognizes that the robot 100 has moved to one of the high-speed travel area H and the low-speed travel area L. When the first magnetic pole is detected after the second magnetic pole is detected, the recognition unit 152 recognizes that the robot has moved to the other one of the high-speed travel area H and the low-speed travel area L. The recognition unit 152 may recognize that the robot has moved to a travel area different from the current travel area when the first magnetic pole is detected. If the polarity of the magnetic member 220 on the upper surface side is the first magnetic pole, the recognition unit 152 may recognize a destination area based on the change in the strength of the first magnetic pole.

The travel control unit 153 controls the movement of the robot 100 based on the area recognition result of the recognition unit 152. The travel control unit 153 controls the robot 100 to travel at high speed when the robot 100 travels in the high-speed travel area H and at low speed when the robot 100 travels in the low-speed travel area L. The travel control unit 153 may control the movement of the robot 100 so as not to exceed the maximum speed in the travel area of the robot 100. The travel control unit 153 may further include the function of generating a traveling route for the robot 100.

Next, the area recognition method according to the first embodiment is described with reference to FIG. 1. It is assumed that the first magnetic pole is the N-pole, and the second magnetic pole is the S-pole. First, the case where the robot 100 moves from the high-speed travel area H to the low-speed travel area L will be described. The arrow indicates a direction in which the robot 100 moves. It is assumed that the robot 100 is traveling in the high-speed travel area H with the safety apparatus 140 operable.

First, the robot 100 passes over the magnetic member 300, and the magnetic sensor 130 detects the S-pole. Next, the switching unit 151 of the control unit 150 switches the state of the safety apparatus 140 to the stopped state. In other words, the robot 100 deactivates the safety apparatus 140.

Next, the robot 100 passes over the magnetic member 210 and the magnetic member 220 in order, and the magnetic sensor 130 detects the N-pole and the S-pole in order. Next, the recognition unit 152 of the control unit 150 recognizes the movement from the high-speed travel area H to the low-speed travel area L.

The robot 100 may start the low-speed traveling according to the recognition by the recognition unit 152. The robot 100 may start the low-speed traveling when the safety apparatus 140 is reactivated after the recognition unit 152 recognizes the travel area.

The robot 100 has switched the state of the safety apparatus 140 to the stopped state after passing over the magnetic member 300. Therefore, when the robot 100 passes over the magnetic member 210, the safety apparatus 140 does not operate.

However, before the magnetic sensors 120a and 120b shown in FIG. 3 pass over the magnetic member 210, the magnetic sensor 130 must detect the magnetic member 300, and the robot 100 must deactivate the safety apparatus 140. Therefore, the distance L1 shown in FIG. 1 must be at least half the distance L2 shown in FIG. 3.

Next, the robot 100 passes over the magnetic member 400, and the magnetic sensor 130 detects the S-pole. The switching unit 151 of the control unit 150 then switches the state of the safety apparatus 140 to the operable state. In other words, the switching unit 151 reactivates the safety apparatus 140. Thus, the robot 100 can safely travel in the low-speed travel area L.

The same is applied when the robot 100 moves from the low-speed travel area L to the high-speed travel area H. First, the robot 100 passes over the magnetic member 400, and the switching unit 151 stops the safety apparatus 140. Next, the magnetic sensor 130 detects the S-pole and the N-pole in order, and the recognition unit 152 recognizes the movement from the low-speed travel area L to the high-speed travel area H. Next, the robot 100 passes over the magnetic member 300, and the switching unit 151 reactivates the safety apparatus 140.

The robot 100 according to the first embodiment can recognize the area where the robot 100 is traveling while preventing the malfunction of the safety apparatus.

Figure 4:
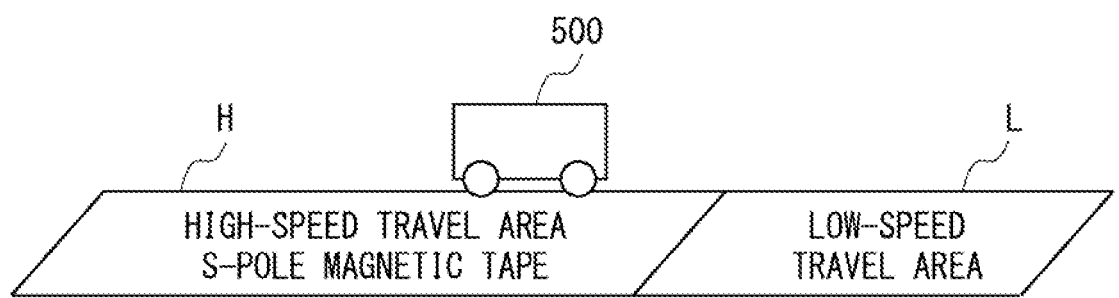
FIG. 4 is an overview diagram showing a configuration of an area recognition system according to related art.

In the first embodiment, it is not necessary to dispose a magnetic member on the entire surface of the low-speed travel area L or the high-speed travel area H. FIG. 4 is an overview diagram showing an area recognition system 2000 according to related art, and shows what the inventor has considered. The area recognition system 2000 includes a robot 500.

A magnetic member (e.g., magnetic tape) is disposed on the entire surface of the high-speed travel area H of the area recognition system 2000. The polarity of the magnetic member on the upper surface side is the second magnetic pole (e.g., the S-pole). When the robot 500 is detecting the second magnetic pole, it recognizes that it is traveling in the high-speed travel area H, whereas when the robot 500 is not detecting the second magnetic pole, it recognizes that it is traveling in the low-speed travel area L.

The robot 500 operates the safety apparatus by detecting the first magnetic pole (e.g., the N-pole). Since the area recognition system 2000 does not perform area recognition using the first magnetic pole (e.g., the N-pole), the area can be recognized while preventing malfunction of the safety apparatus. However, the area recognition system 2000 has a problem that a magnetic member must be disposed on the entire surface of the low-speed travel area L or the high-speed travel area H.

The area recognition system 1000 according to the first embodiment does not require a magnetic member to be disposed on the entire surface of the low-speed travel area L or the high-speed travel area, and has the advantage of low cost compared to related art.

In the above example, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

It should be noted that the present disclosure is not limited to the above embodiment and can be changed as appropriate without departing from the purport.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An area recognition system for recognizing a travel area of a robot, the area recognition system comprising:
    a first magnetic member, a second magnetic member and a third magnetic member disposed between different travel areas, and arranged with respect to each other along a traveling direction of the robot, wherein the first magnetic member is disposed between the second magnetic member and the third magnetic member in the traveling direction of the robot, wherein
    a polarity of the first magnetic member on an upper surface side thereof is a first magnetic pole, the first magnetic pole being one of an N-pole and an S-pole,
    the polarity of each of the second magnetic member and the third magnetic member on the upper surface side thereof is a second magnetic pole, the second magnetic pole being different from the first magnetic pole, and
    the robot comprises:
        a first magnetic sensor configured to detect the first magnetic pole and not the second magnetic pole;
        a safety apparatus configured to suppress an operation of the robot in response to the detection of the first magnetic pole by the first magnetic sensor;
        a second magnetic sensor configured to be capable of detecting both the first and second magnetic poles;
        a switching unit configured to switch between a stopped state and an operable state of the safety apparatus in response to the detection of the second magnetic pole by the second magnetic sensor; and
        a recognition unit configured to recognize a movement of the robot between the different travel areas by detecting the first magnetic member.

2. The area recognition system according to claim 1, wherein
    the number of the first magnetic sensors is more than one, and
    the plurality of the first magnetic sensors are disposed on the robot so that at least one of the plurality of first magnetic sensors is located on a front side of the robot in a traveling direction of the robot and at least another one of the plurality of first magnetic sensors is located on a rear side of the robot in the traveling direction of the robot, and
    the second magnetic sensor is centered between the at least one of the plurality of the first magnetic sensors on the front side and the at least another one of the plurality of first magnetic sensors on the rear side, and
    a distance between the first magnetic member and the second magnetic member is more than or equal to half a distance between the at least one of the plurality of the first magnetic sensors on the front side and the at least another one of the plurality of the first magnetic sensors on the rear side.

3. The area recognition system according to claim 1, wherein
    the different travel areas of the robot includes a high-speed travel area and a low-speed travel area, wherein the high-speed travel area has a speed greater than the low-speed travel area,
    the first magnetic member is a pair of first magnetic members,
    the polarity of one of the pair of first magnetic members on the upper surface side is the second magnetic pole and the polarity of the other one of the pair of first magnetic members is the first magnetic pole,
    when the second magnetic sensor detects the first magnetic pole and then detects the second magnetic pole, the recognition unit recognizes a movement of the robot to one of the high-speed travel area and the low-speed travel area, and
    when the second magnetic sensor detects the second magnetic pole and then detects the first magnetic pole, the recognition unit recognizes the movement of the robot to the other of the high-speed travel area and the low-speed travel area.

4. The area recognition system according to claim 3, further comprising an additional magnetic member for operating the safety apparatus that is disposed in the high-speed travel area and the low-speed travel area, and the polarity of the additional magnetic member on the upper surface side is the first magnetic pole.

5. An area recognition method for recognizing a travel area of a robot, a first magnetic member, a second magnetic member and a third magnetic member disposed between different travel areas, and arranged with respect to each other along a traveling direction of the robot, wherein the first magnetic member is disposed between the second magnetic member and the third magnetic member in the traveling direction of the robot, a polarity of the first magnetic member on an upper surface side thereof being a first magnetic pole, the first magnetic pole being one of an N-pole and an S-pole, the polarity of each of the second magnetic member and the third magnetic member on the upper surface side is a second magnetic pole, the second magnetic pole being different from the first magnetic pole, and the robot comprising:

a first magnetic sensor configured to detect the first magnetic pole and not the second magnetic pole;

a safety apparatus configured to suppress an operation of the robot in response to the detection of the first magnetic pole by the first magnetic sensor; and a second magnetic sensor configured to be capable of detecting both the first and second magnetic poles, the area recognition method comprising:

switching, by the robot, between a stopped state and an operable state of the safety apparatus in response to the detection of the second magnetic pole by the second magnetic sensor; and recognizing, by the robot, a movement of the robot between the different travel areas by detecting the first magnetic member.

6. A non-transitory computer readable medium storing a program for causing a computer to execute the area recognition method according to claim 5.

* * * * *